United States Patent
Magalhães Mendes et al.

(10) Patent No.: US 12,398,033 B2
(45) Date of Patent: Aug. 26, 2025

(54) CATALYTIC METHANE DECOMPOSITION AND CATALYST REGENERATION, METHODS AND USES THEREOF

(71) Applicant: PIXEL VOLTAIC LDA, Maia (PT)

(72) Inventors: Adélio Miguel Magalhães Mendes, Oporto (PT); Cecilia Mateos Pedrero, Maia (PT); Margarida Dias Catarino, São Mamede de Infesta (PT)

(73) Assignee: PIXEL VOLTAIC LDA, Maia (PT)

( * ) Notice: Subject to any disclaimer, the term of this patent is extended or adjusted under 35 U.S.C. 154(b) by 776 days.

(21) Appl. No.: 17/413,408

(22) PCT Filed: Dec. 16, 2019

(86) PCT No.: PCT/IB2019/060868
§ 371 (c)(1),
(2) Date: Jun. 11, 2021

(87) PCT Pub. No.: WO2020/121287
PCT Pub. Date: Jun. 18, 2020

(65) Prior Publication Data
US 2022/0073345 A1    Mar. 10, 2022

(30) Foreign Application Priority Data
Dec. 14, 2018   (PT) .......................................... 115211

(51) Int. Cl.
*C01B 3/26*     (2006.01)
*B01D 53/22*    (2006.01)
(Continued)

(52) U.S. Cl.
CPC .............. *C01B 3/26* (2013.01); *B01D 53/229* (2013.01); *B01D 53/326* (2013.01);
(Continued)

(58) Field of Classification Search
CPC ................ B01D 53/229; B01D 53/326; B01D 2256/16; B01J 8/025; B01J 8/0292;
(Continued)

(56) References Cited

U.S. PATENT DOCUMENTS 6,632,765 B1 * 10/2003 Chen ........................ B01J 38/10
502/53
2005/0063900 A1    3/2005 Wang
(Continued)

FOREIGN PATENT DOCUMENTS

| CN | 101912792 A | 12/2010 |
| EP | 1227062 A1 | 7/2020 |
| JP | 3985038 B2 * | 10/2007 |

OTHER PUBLICATIONS

Cho et al. JP3985038B2 English Translation (Year: 2003).*
(Continued)

*Primary Examiner* — Sally A Merkling
*Assistant Examiner* — Jordan W Taylor
(74) *Attorney, Agent, or Firm* — Leason Ellis LLP (57) ABSTRACT

The present disclosure relates to a low temperature method for the production of pure hydrogen using a methane rich stream as raw material, and to perform in-situ catalyst regeneration. The process involves the decomposition of methane into COx-free hydrogen in an electrochemical/chemical membrane/chemical reactor or chemical fluidised reactor. As the methane decomposition reaction progresses, carbon structures (whiskers) are accumulated at the catalyst surface leading eventually to its deactivation. The catalyst regeneration is achieved using a small fraction of the produced hydrogen to react with carbon formed at the catalyst surface provoking the carbon detachment, thus regenerating the catalyst. This is achieved either by chemical/electrochemical methanation of carbon at the catalyst interface with hydrogen/protons or by rising the temperature of the cata-
(Continued)

lyst, ideally keeping the reactor temperature constant. A single compact device is described, enabling the hydrogen production, hydrogen purification and catalyst regeneration.

13 Claims, 4 Drawing Sheets

(51) Int. Cl.
| | |
|---|---|
| B01D 53/32 | (2006.01) |
| B01J 8/02 | (2006.01) |
| B01J 8/24 | (2006.01) |
| B01J 19/24 | (2006.01) |
| B01J 21/04 | (2006.01) |
| B01J 21/06 | (2006.01) |
| B01J 23/755 | (2006.01) |
| B01J 37/08 | (2006.01) |
| B01J 37/16 | (2006.01) |
| B01J 38/10 | (2006.01) |
| C01B 3/50 | (2006.01) |
| C25B 1/02 | (2006.01) |
| C25B 9/19 | (2021.01) |
| C25B 11/052 | (2021.01) |
| C25B 11/069 | (2021.01) |
| C25B 11/075 | (2021.01) |
| C25B 13/07 | (2021.01) |
| C25B 15/08 | (2006.01) |

(52) U.S. Cl.
CPC ............... *B01J 8/0292* (2013.01); *B01J 8/24* (2013.01); *B01J 19/2475* (2013.01); *B01J 21/04* (2013.01); *B01J 21/06* (2013.01); *B01J 23/755* (2013.01); *B01J 37/08* (2013.01); *B01J 37/16* (2013.01); *B01J 38/10* (2013.01); *C01B 3/505* (2013.01); *C25B 1/02* (2013.01); *C25B 9/19* (2021.01); *C25B 11/052* (2021.01); *C25B 11/069* (2021.01); *C25B 11/075* (2021.01); *C25B 13/07* (2021.01); *C25B 15/085* (2021.01); *C01B 2203/0277* (2013.01); *C01B 2203/0405* (2013.01); *C01B 2203/1011* (2013.01); *C01B 2203/1047* (2013.01); *C01B 2203/1058* (2013.01); *C01B 2203/1082* (2013.01)

(58) Field of Classification Search
CPC . B01J 8/24; B01J 19/2475; B01J 21/04; B01J 21/06; B01J 23/755; B01J 23/94; B01J 35/33; B01J 35/59; B01J 37/08; B01J 37/16; B01J 38/02; B01J 38/10; B01J 2208/00407; B01J 2208/025; C01B 3/26; C01B 3/30; C01B 3/505; C01B 2203/0277; C01B 2203/0405; C01B 2203/041; C01B 2203/1011; C01B 2203/1047; C01B 2203/1058; C01B 2203/1076; C01B 2203/1082; C01B 2203/1241; C25B 1/02; C25B 9/19; C25B 9/23; C25B 11/052; C25B 11/069; C25B 11/075; C25B 13/07; C25B 15/00; C25B 15/085; Y02P 20/584
See application file for complete search history.

(56) References Cited

U.S. PATENT DOCUMENTS

2016/0129424 A1 5/2016 Pant et al.
2017/0333889 A1 11/2017 Clancy-Jundt et al.

OTHER PUBLICATIONS

Kyriakou et al. Applied Catalysis B Environmental 2016, 186, 1-9 (Year: 2016).*
Lucas-Consuegra et al. Journal of Catalysis 2010, 274, 251-258 (Year: 2010).*
Bousquet, P., Tyler, S. C., Peylin, P., Van Der Werf, G. R., Prigent, C., Hauglustaine, D. A., Dlugokencky, E. J., Miller, J. B., Ciais, P., White, J., Steele, L. P., Schmidt, M., Ramonet, M., Papa, F., Lathière, J., Langenfelds, R. L., Carouge, C., & Brunke, E.-G. (2006). Contribution of anthropogenic and natural sources to atmospheric methane variability. Nature, 443(7110), 439-443.
Lewis, S. L. (2016). The Paris Agreement has solved a troubling problem. Nature, 532(7599), 283.
Lua, A.C., & Wang, H.Y. (2013). Decomposition of methane over unsupported porous nickel and alloy catalyst. Applied Catalysis B: Environmental, 132-133, 469-478.
Shah, N., Panjala, D., & Huffman, G.P. (2001). Hydrogen Production by Catalytic Decomposition of Methane. Energy & Fuels, 15(6), 1528-1534.
Upham, D.C., Agarwal, V., Khechfe, A., Snodgrass, Z.R., Gordon, M.J., Metiu, H., & McFarland, E.W. (2017). Catalytic molten metals for the direct conversion of methane to hydrogen and separable carbon. Science, 358(6365), 917-921.
Julianelli A. et al., "H2 production by low pressure methane steam reforming in a Pd—Ag membrane reactor over a Ni-based catalyst: Experimental and modeling", vol. 35; No. 20; pp. 11514-11524, Oct. 1, 2010.
Angelo Basile, et al., "Methane steam reforming in a PdAg membrane reformer: An experimental study on reaction pressure influence at middle temperature", International Journal of Hydrogen Energy, vol. 36, No. 2, pp. 1531-1539.
Jangam Ashok, et al., "Methane decomposition catalysts for COX-free hydrogen production", Reviews in Chemical Engineering, vol. 26, No. 1-2, Oct. 26, 2010.
Makvandi, S. et al., "COX Free Hydrogen Production by Catalytic Decomposition of Methane Over Porous Ni/Al2O3 Catalysts", Iranian Journal of Chemical Engineering, vol. 8, No. 4, pp. 24-33, Jan. 2011.

* cited by examiner

CATALYTIC METHANE DECOMPOSITION AND CATALYST REGENERATION, METHODS AND USES THEREOF

CROSS-REFERENCE TO RELATED APPLICATIONS

This application is a U.S. National Stage Application under 35 U.S.C. § 371 of International Patent Application No. PCT/IB2019/060868, filed Dec. 16, 2019, which claims priority to Portugal Application No. 115211, filed Dec. 14, 2018, the contents of all of which are hereby incorporated by reference in their respective entireties.

TECHNICAL FIELD

The present disclosure relates to a process to produce pure hydrogen (fuel cell grade) and carbon, an added-value product using methane as main source. The disclosure also discloses a method to remove the accumulated carbon at the catalyst surface by performing in-situ carbon removal.

More particularly, the present disclosure corresponds to a low-temperature method to decompose methane into COx-free hydrogen using an electrochemical/chemical membrane/chemical reactor. The regeneration method is carried out by feeding a small fraction of the produced hydrogen to the catalyst interface yielding methane as main product, making the carbon accumulated on the catalyst surface to detach.

This method enables hydrogen production from methane decomposition and catalyst regeneration in a single compact device.

BACKGROUND

One of the major challenges of the last decades is lowering greenhouse gases effect to the atmosphere. The increased volumes of $CO_2$ and other greenhouse gases released by the burning of fossil fuels, livestock farming, landfills and waste, agriculture, and other human activities, are believed to be the primary sources of the global warming [P. Bousquet et al., Nature 443 (2006) 439-443]. As a result, during the last 30 years, the global temperature rose 0.2° C. per decade, which has damaged marine ecosystems and the terrestrial biosphere to a great extent. The Paris Agreement defined that the threshold for irreversible environmental changes is 1.5° C. above pre-industrial levels [S. L. Lewis, Nature 532 (2016) 283]. On the other hand, the energy demand still increases, while fossil fuel resources decrease. These are major challenges that the energy production sector has to face nowadays. Thus, it is necessary to develop new ways of energy production ensuring higher yields with lower pollutant gases emissions and at controlled costs.

In this scenario, hydrogen represents a promising energy vector since, unlike fossil fuels, the conversion of hydrogen into electrical power does not cause the emission of greenhouse gases or other atmosphere pollutants. The demand for hydrogen is expected to increase in the coming years due to its use in fuel cells in automotive and power generation applications.

Traditionally, hydrogen is produced by steam reforming and autothermal reforming of natural gas. The main drawback of these processes is the production of high levels of $CO_x$ along with hydrogen. Moreover, as some processes that use hydrogen as fuel or chemical feedstock require pure hydrogen, additional separation and purification units are required.

Decomposition of methane represents a worthwhile approach for production of $CO_x$-free hydrogen and valuable carbon [N. Shah et al., Energy & Fuels 15 (2001) 1528-1534; A. C. Lua et al., Applied Catalysis B: Environmental 132 (2013) 469-478], which offers remarkable advantages with respect to the conventional reforming methods: (i) slightly endothermic reaction; (ii) one step process, if coupled with common separation technologies to remove hydrogen from the product stream which contains unreacted methane; (iii) unseparated mixture of hydrogen and methane is a more effective fuel for internal combustion engines and gas turbine power plants than natural gas; (iv) when methane from biomass is used as source, it removes effectively carbon from the atmosphere. Methane decomposition allows then harnessing the benefits of hydrogen produced in an environmentally way that meet world's growing energy needs.

Prior art methods for producing hydrogen and/or valued carbon make use of thermal processes for hydrocarbon decomposition. WO 93/20152 patent discloses an assisted plasma process to decompose hydrocarbons in hydrogen and carbon black with defined physical properties, at temperatures between 1000° C. and 2000° C. U.S. Pat. No. 6,773,689 document is related to a process of carbon structures production from heavy hydrocarbons, characterised by a one or two-step plasma steps. Hydrogen is also formed in this method and can be used as plasma gas. US 2006/0021510 patent discloses a method and apparatus for obtaining $CO_2$-free hydrogen from greenhouse gas saturated carbon nanotubes, at a temperature range between 527° C. and 3227° C. Additionally, carbon nanotubes are produced during this process.

These methods suffer from the main disadvantage of being carried out at very high temperatures, resulting in low efficiency and high costs.

Many attempts have been applied in order to overcome the high temperature demands of thermal decomposition methods. US 2004/0148860 patent discloses a method and apparatus to decompose natural gas or methane directly into hydrogen and carbon using a barrier discharge non-thermal plasma application. In this disclosure solid carbon is separated from hydrogen by filtration or by using a negatively charged electrode. WO 2007/019664, US 2009/0038933 and U.S. Pat. No. 8,221,689 documents are related to a process based on a cold arc discharge to decompose natural gas or methane into its gaseous constituents, mainly hydrogen and acetylene, and solid carbon. The main advantage of this method is running the reactor at low temperatures (<200° C.). WO 2011/022761 and US 2013/0153403 family disclosures disclose a non-catalytic process and an apparatus for generating hydrogen and synthetic carbon-free gas by plasma reforming of methane and other hydrocarbons. This process shows as major advantages: lower energy consumption, higher energy efficiency in production, scalability of application and high decomposition conversion. Although these methods solve the problem of using high temperature on hydrocarbon decomposition, they need hardly available apparatus which restrains their use.

Concerning the catalyst deactivation issue, prior art methods have considered different strategies for catalyst regeneration.

U.S. Pat. No. 6,509,000 document is related to a process for the continuous production of hydrogen from steam reforming of methane-rich hydrocarbon at low temperature (350° C. to 650° C.), using a solid catalyst comprising metal oxides from group VIII. The catalyst regeneration is carried out by switching the reactor feed between hydrocarbon or steam flows. The application considers two parallel reactors for the simultaneous steam reforming and regeneration steps, providing a continuous production of pure hydrogen.

US 2006/0257310 and U.S. Pat. No. 7,767,182 documents describe a method to obtain functional nanocarbon and hydrogen from catalytic decomposition of low hydrocarbons. The method considers co-feeding a gas flow comprising low concentration of an oxidising gas, reducing gas or a mixture thereof that reacts with the deposited carbon for being removed from the catalyst, making it possible to prevent the drop of conversion with time on stream.

U.S. Pat. No. 9,061,909 document discloses a method and an apparatus for the simultaneous production of carbon nanotubes and hydrogen, using a pseudo-continuous device where the growth of carbon nanotubes, the synthesis of hydrogen, the recovery of the carbon nanotubes, and the recovery of the hydrogen are repeatedly performed. The method also discloses the feeding of a gaseous stream to separate the carbon nanotubes and an oxidising gas to remove carbon remaining on the catalyst.

U.S. Pat. No. 9,358,536 disclosure is related to a method and device for producing aromatic hydrocarbons. Additionally, carbon residues are formed as by-product which causes catalyst deactivation and fouling of reactor pipelines. This document is also related to a method for minimising the carbon deposition, by adding a small amount of carbon dioxide during the reaction, and a regeneration method comprising the replacement of the reaction feed by a regeneration gas in a cyclic way. This regeneration gas is obtained by separating the targeted hydrocarbon after the catalytic reaction, which can comprise a significant amount of hydrogen (ca. 25 vol. %). The process is carried out using two parallel reactors, conducting the reaction and the regeneration steps, at 300° C. to 900° C. and 0.1 bar to 10 bar.

Upham et al. (2017) disclose a process for pyrolysis of methane into hydrogen and carbon using molten metal alloy catalysts at ca. 1000° C. Metal alloys are composed by noble materials that are usually active for methane decomposition (e.g., Ni, Pt, Pd) dissolved in low-melting temperature metals (e.g., In, Ga, Sn, Pb). Catalyst deactivation due to solid carbon build-up is minimised because the carbon particles float to the surface of the molten metal and can be removed from the reactor [Upham et al., Science 358 (2017) 917-921].

The present disclosure relates to a process for producing pure hydrogen (fuel cell grade) and carbon, an added-value product, using methane as main source. The disclosure discloses a method for methane decomposition and catalyst regeneration, in a single and compact device; the methane decomposition produces carbon that accumulates at the catalyst surface provoking its deactivation after a short time of operation, between 30 h and 500 h.

These facts are disclosed in order to illustrate the technical problem addressed by the present disclosure.

GENERAL DESCRIPTION

The present subject-matter describes a low-temperature method to decompose methane into $CO_x$-free hydrogen using an electrochemical/chemical membrane reactor, a packed bed chemical reactor or a fluidised bed chemical reactor. The regeneration method is carried out by feeding a small fraction of the produced hydrogen to convert the carbon at the interface with the catalyst to methane thus allowing the detachment of the formed carbon particles.

Unlike former thermal decomposition methods, the method described in present application is performed at low temperature (same temperature to that of the reaction). In opposition to plasma assisted methods, this application is related to a method involving non expensive operation devices.

Contrasting to the prior art methods, the present subject-matter discloses an effective regeneration method that promotes the hydrogenation of the deposited carbon using a very small fraction of the generated hydrogen (up to 5 vol. %), allowing a continuous production of hydrogen. As this approach does not involve the use of an oxidising gas (such as oxygen, steam or carbon dioxide) to remove the formed carbon, it avoids the production of $CO_x$ greenhouse gases as well as the oxidation of metal based catalysts.

The method disclosed in the present subject-matter enables hydrogen production, hydrogen purification and catalyst regeneration in a single compact device. The catalyst regeneration is achieved by rising the temperature of the catalyst, ideally keeping the reactor temperature constant when methane at the inlet is replaced by hydrogen, or by electrochemically pumping hydrogen to the catalyst. Both methods allow detaching the carbon particles from the catalyst surface. The hydrogenation of carbon at the catalyst interface produces methane.

The catalytic decomposition of methane of the present disclosure offers the possibility of overcoming the major drawbacks of the above mentioned methods. Giving that, the temperature can be considerably decreased to about 500 to 600° C., which leads to less energy demand and the use of reactors made of cheaper materials. However, the catalyst suffers from deactivation due to solid carbon build-up, which impairs its long-term applicability.

An aspect of the present disclosure relates to a low temperature method for the production of pure hydrogen using a methane rich stream as raw material, and to perform in-situ catalyst regeneration.

In an embodiment, comprises the decomposition of methane into $CO_x$-free hydrogen in an electrochemical/chemical membrane/chemical reactor or chemical fluidised reactor. As the methane decomposition reaction progresses, carbon structures (whiskers) are accumulated at the catalyst surface leading eventually to its deactivation. The catalyst regeneration is achieved using a small fraction of the produced hydrogen to react with carbon formed at the catalyst surface provoking the carbon detachment, thus regenerating the catalyst. This is achieved either by chemical/electrochemical methanation of carbon at the catalyst interface with hydrogen/protons or by rising the temperature of the catalyst, ideally keeping the reactor temperature constant.

Another aspect of the present disclosure relates to a single compact device is described, enabling the hydrogen production, hydrogen purification and catalyst regeneration.

An aspect of the present disclosure relates to a process for producing hydrogen comprising:
  feeding a methane rich stream to a chemical or electrochemical reactor;
  wherein the chemical reactor comprising a catalyst supported in a ceramic membrane or in a ceramic bed;
  contacting the methane rich stream with the catalyst at the selected temperature to produce hydrogen and solid carbon;
  adding a regenerating stream to react at the catalyst interface with deposited carbon for the catalyst regeneration.

In an embodiment, the chemical reactor is selected from: a membrane reactor, a packed bed reactor, a fluidised bed reactor.

In an embodiment, the regenerating stream is a hydrogen stream, preferably a hydrogen pure stream.

In an embodiment, the process is a continuous process.

In an embodiment, the molar ratio between the hydrogen pure stream and the hydrogen produce stream varies 5:95-15:85; 3:97-10:90.

In an embodiment, the process further comprises a previous step of activating the catalyst by heating and reducing the catalyst at a selected temperature and atmosphere.

In an embodiment the ceramic membrane comprises:
porous ceramic membranes such as $Al_2O_3$, $SiO_2$, $TiO_2$ and $ZrO_2$; or
dense ceramic membranes such as BCY, BZY and BCZY; or
porous or dense metallic membranes based on Pd or Pd alloys.

In an embodiment, the ceramic membrane further comprises a coating, preferably a coating layer comprising Ni, Fe, or mixtures thereof.

In an embodiment the reactor further comprises a proton conducting cell for electrochemical separation of hydrogen from unreacted methane.

In an embodiment, the catalyst is activated with a hydrogen, methane or mixtures thereof; at a temperature between 350° C. and 750° C., more preferably between 500° C. and 600° C.

In an embodiment, the decomposition of the methane rich stream and carbon detachment is performed in a range of temperature of 500° C. and 750° C., more preferably between 550° C. and 650° C.

In an embodiment, the pressure is varied from 1 bar to 30 bar, preferably from 1 bar to 10 bar, more preferably from 3 bar to 6 bar.

In an embodiment, the regeneration duration ranges from 10 min to 5 h, preferably 15 min-2 h, more preferably 30 min-1 h.

In an embodiment, the methane rich stream comes from different sources such as biomass, natural gas, tail gases and livestock farming.

In an embodiment, the regenerating gas is pure hydrogen recovered from the reaction step.

In an embodiment, the regeneration stream comprises the downstream gas from the reaction step, comprising mostly of hydrogen and unconverted methane.

In an embodiment, the hydrogen consumed for the carbon removal represents a small fraction (up to 5 vol. %) of the hydrogen produced during methane decomposition.

In an embodiment, the electrochemical reactor comprises an electrocatalyst, a proton conductor membrane and a counter-electrode.

In an embodiment, the catalyst of the packed bed reactor is in pellets.

In an embodiment, the catalyst of the fluidised bed reactor is in pellets.

In an embodiment, the chemical reactor further comprises a separation membrane.

In an embodiment, the electrochemical reactor comprises an electrocatalyst, a proton conductor membrane and a counter-electrode and wherein the carbon detaching from a catalyst surface of a electrochemical reactor comprises contacting the catalyst with an inert gas flow; feeding the counter-electrode with a hydrogen pure stream for the catalyst regeneration.

In an embodiment, the step of applying a potential difference between both electrodes to promote the permeation of the hydrogen from the regenerating gas through the membrane to react at the catalyst interface with deposited carbon for yielding methane and originating the carbon detachment from the catalyst surface.

In an embodiment, the regenerating gas is fed directly in the catalyst side above the atmospheric pressure, at a selected temperature, to react with formed carbon yielding methane.

In an embodiment, the catalyst/electrocatalyst comprises Ni, Fe, Co particles and mixture thereof.

In an embodiment, the catalyst is in pellet or in a compacted form.

In an embodiment, the methane rich stream comes from different sources such as biomass, natural gas, tail gases and livestock farming.

In an embodiment, the pressure ranges from 1 bar to 30 bar, preferably from 1 bar to 10 bar, more preferably from 3 bar to 6 bar.

BRIEF DESCRIPTION OF THE DRAWINGS

The following figures provide preferred embodiments for illustrating the description and should not be seen as limiting the scope of disclosure.

DETAILED DESCRIPTION

The present disclosure is also further described, in particular, using embodiments of the disclosure. Therefore, the disclosure is not limited to the descriptions and illustrations provided. These are used so that the disclosure is sufficiently detailed and comprehensive. Moreover, the intention of the drawings is for illustrative purposes and not for the purpose of limitation.

It is disclosed a method for the production of pure hydrogen using methane as raw material (Equation 1), and to perform in-situ catalyst regeneration. The hydrogen is obtained by catalytic decomposition of methane according to the following equation:

$$CH_4(g) \leftrightarrows 2H_2(g) + C(s) \Delta H° = 75 \ kJ \cdot mol^{-1} \quad (1)$$

According to Equation (1), solid carbon (coke) is also produced, which causes catalyst deactivation. In order to overcome this limitation, a catalyst regeneration step is required.

The present disclosure discloses a method for catalyst regeneration that uses hydrogen to remove coke at the catalyst interface, leading to the detachment of the carbon accumulated on the catalyst surface. Under the considered conditions mainly methane is produced, according to the next equation:

$$2H_2(g) + C(s) \leftrightarrows CH4(g) \Delta H° = -75 \ kJ \cdot mol^{-1} \quad (2)$$

The method can be performed in an electrochemical/chemical membrane/bed reactor. The reactor involves a Ni-based catalyst supported on a separation membrane or just a Ni-based supported catalyst, while the electrochemical reactor consists of a MEA (membrane electrode assembly) composed by a Ni-based cathode, a proton conductor membrane and a counter-electrode anode (e.g. Pt or cermet suitable for hydrogen oxidation). Methane is fed to the Ni side where it is decomposed to hydrogen and carbon.

The present application also describes a method for catalyst regeneration involving the hydrogenation of coke at the catalyst interface, leading to its detachment. During this step, mainly traces of methane are formed avoiding the contamination of hydrogen with undesired $CO_x$ off-gases. The permeation of hydrogen towards Ni interface is achieved by electrochemical pumping. A potential difference is applied between Ni and the counter-electrode; protons permeate across the proton conductor membrane, reducing coke to methane at the Ni interface with electrons conducted by the external electrical circuit.

In an embodiment of the present application, catalyst regeneration is achieved supplying hydrogen to the Ni side. The Ni-based catalyst is supported in a membrane permeable to hydrogen or supported Ni-based catalyst pellets. Selective methanation of carbon takes place at the carbon-Ni interface, making carbon particles to detach. Moreover, selective heating up of the metal catalyst also promotes carbon detachment upon hydrogenation of the catalyst/carbon interface. The selective heating of the catalyst is achieved adding to it ceramic additives with very high relative permittivity such as calcium copper titanate ($CaCu_3Ti_4O_{12}$), barium titanate ($BaTiO_3$) or strontium titanates ($SrTiO_3$ and $Sr_2TiO_4$). These materials absorb microwaves allowing the selective heating upon using a microwave source. The same effect can also be achieved by electrical heating the membrane or, more generally, the reactor; however, this is a less selective heating process besides being slower.

The terminology used in the present application is for the purpose of description and should not be regarded as limiting.

The terms "methane decomposition" and "decomposition" are used interchangeably herein when referring to the methane cracking leading to hydrogen and solid carbon, according to Equation (1).

The terms "carbon", "solid carbon", "carbon particles", "carbon whiskers" and "coke" are used interchangeably herein when referring to the solid product of methane decomposition, according to Equation (1).

The terms "regeneration", "carbon removal" and "hydrogenation" are used interchangeably herein when referring to the reaction between solid carbon and hydrogen to produce methane, according to Equation (2).

This present subject-matter discloses a method for methane decomposition and catalyst regeneration, in a single and compact device; the methane decomposition produces carbon that accumulates at the catalyst surface provoking its deactivation after a short time of operation, between 30 h and 120 h.

Figure 1:
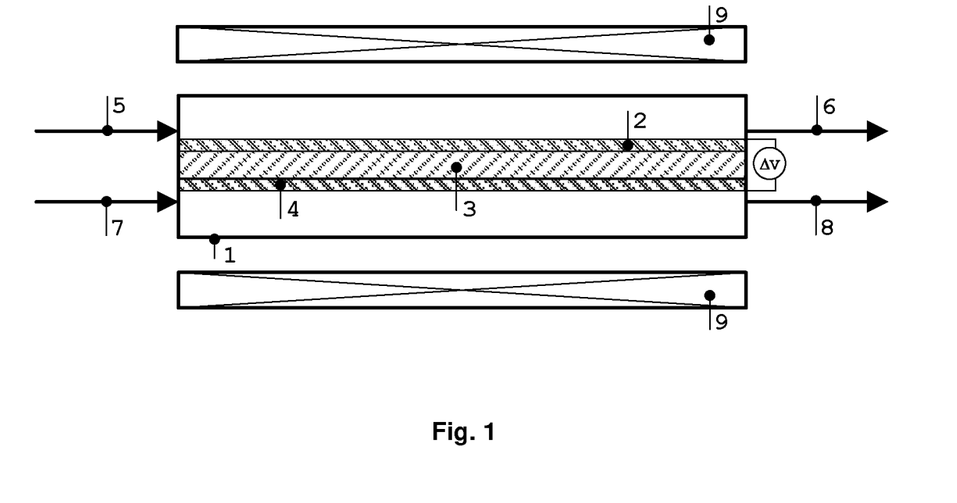
FIG. 1 illustrates a simplified schematic diagram of a device for the production of hydrogen and carbon, with catalyst regeneration:
(1)—represents the electrochemical chemical reactor;
(2)—represents the electrode that includes the catalyst;
(3)—represents the proton conductor ceramic membrane;
(4)—represents the counter-electrode;
(5)—represents the inlet stream of the catalyst side;
(6)—represents the downstream flow of the catalyst side;
(7)—represents the inlet stream of the counter-electrode side;
(8)—represents the downstream flow of the counter-electrode side;
(9)—represents the heating system.

In a preferred embodiment, the methane decomposition is carried out in an electrochemical membrane reactor as illustrated in FIG. 1. This reactor (1) includes a MEA composed by a cermet cathode loaded with a Ni-based catalyst (2), a proton conductor ceramic membrane (3) and a counter-electrode (e.g. Pt or cermet suitable for hydrogen oxidation) (4). The cathode electrode (2) is then fed with methane (5) which is decomposed into hydrogen and carbon at the Ni-based catalyst. This reaction is performed in a range of temperature of 500° C. and 750° C., more preferably between 550° C. and 650° C. The reactor (1) is heated by means of a temperature-controlled heating device (9). In this embodiment, the catalyst regeneration is obtained by electrochemically pumping hydrogen from the anode (4) to the cathode (2) side, which is achieved applying a potential difference to the electrodes, where the negative side is the cathode. At the catalyst interface (2), hydrogen reacts selectively with the deposited carbon, producing mostly methane, allowing its detachment. In this embodiment, examples of said dense proton conductive membrane are BCY (yttrium-doped barium cerate), BZY (yttrium-doped barium zirconate) and BCZY (yttrium-doped barium cerate-zirconate) and the cathode layer is a cermet made of a composite of these materials and the Ni-based catalyst. The anode layer is made of a Pt catalyst or a cermet suitable for the hydrogen oxidation.

Figure 2:
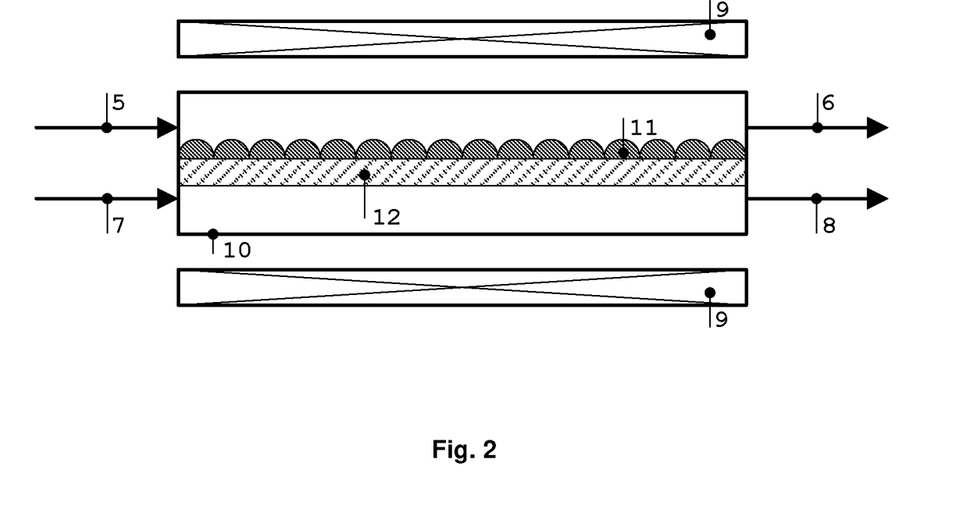
FIG. 2 illustrates a simplified schematic diagram of an alternative device for the production of hydrogen and carbon, with catalyst regeneration:
(5)—represents the inlet stream of the catalyst side;
(6)—represents the downstream flow of the catalyst side;
(7)—represents the inlet stream of the permeate side of the membrane;
(8)—represents the downstream flow of the permeate side of the membrane;
(9)—represents the heating device;
(10)—represents the chemical reactor;
(11)—represents the catalyst;
(12)—represents the hydrogen permselective membrane.

In another embodiment of the present application, methane decomposition is carried out in a chemical membrane reactor illustrated in FIG. 2. This reactor (10) includes a Ni-based catalyst (11) supported on a hydrogen and methane permeable membrane (12). In this embodiment, porous and dense ceramic or metallic membranes are applied. The membrane reactor (10) is fed with methane (5) which is decomposed into hydrogen and carbon on the Ni-based catalyst (11). This reaction is performed in a range of temperature of 500° C. and 750° C., more preferably between 550° C. and 650° C. The reactor (10) is heated by means of a temperature-controlled heating device (9). In this embodiment methane (7) is fed in the permeate side of the membrane (12) that sweeps hydrogen formed in the Ni catalyst (11) and supplies fresh methane to the reaction locus. This configuration allows methane conversion increase due to the reaction equilibrium shift. In this embodiment, examples porous ceramic membranes are $Al_2O_3$, $SiO_2$, $TiO_2$ and $ZrO_2$. During the regeneration step, hydrogen (7) is fed to the permeate side and the Ni-based catalyst (11) is heated up when methane decomposition is interrupted. The regeneration of the catalyst can also be obtained using porous or dense membranes by increasing the hydrogen partial pressure or the temperature. This allows the hydrogenation of the carbon layer attached to the catalyst making the carbon particle to detach it. Carbon reduction at the catalyst interface can rely a chemical reaction with hydrogen or an electrochemical reaction with protons and electrons.

Figure 3:
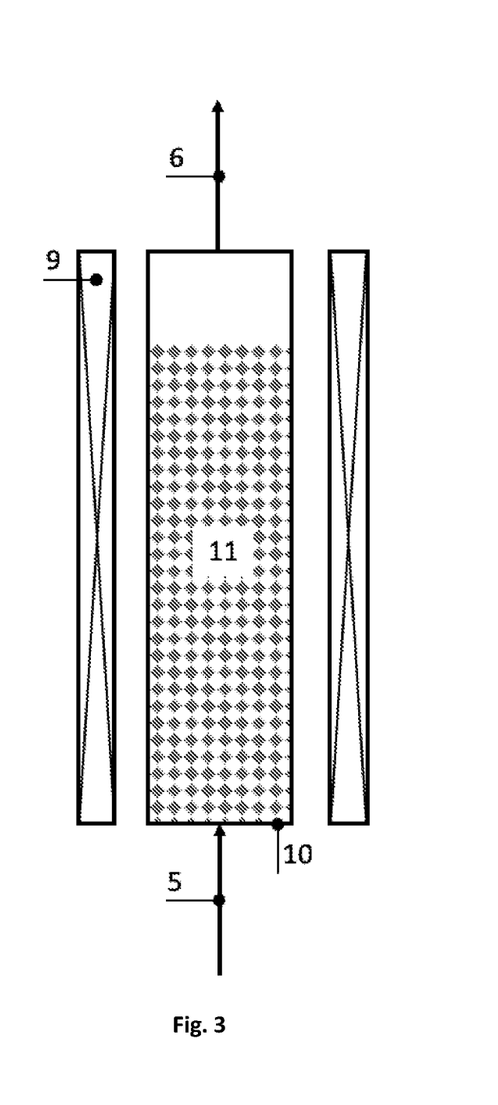
FIG. 3 illustrates a simplified schematic diagram of an alternative device for the production of hydrogen and carbon, with catalyst regeneration:
(5)—represents the inlet stream of the catalyst side;
(6)—represents the downstream flow of the catalyst side;
(9)—represents the heating device;
(10)—represents the chemical reactor;
(11)—represents the catalyst.

In a further embodiment of the present disclosure, methane decomposition can be carried out in a packed bed reactor as illustrated in FIG. 3. In the reactor (10) the Ni-based supported catalyst particles (11) contact with a methane inlet flow (5) which is decomposed into hydrogen and solid carbon. The decomposition reaction is performed in a range of temperature of 500° C. and 750° C., more preferably between 550° C. and 650° C. The carbon particles detachment from the metal catalyst can be achieved by increasing the hydrogen partial pressure and/or the temperature. However, this procedure is less selective to the hydrogenation of the interfacial carbon layer, originating a higher hydrogen consumption. After the detachment of the carbon particles, the bed is fluidised for carbon particles removal. The methane decomposition cycle is then resumed.

Figure 4:
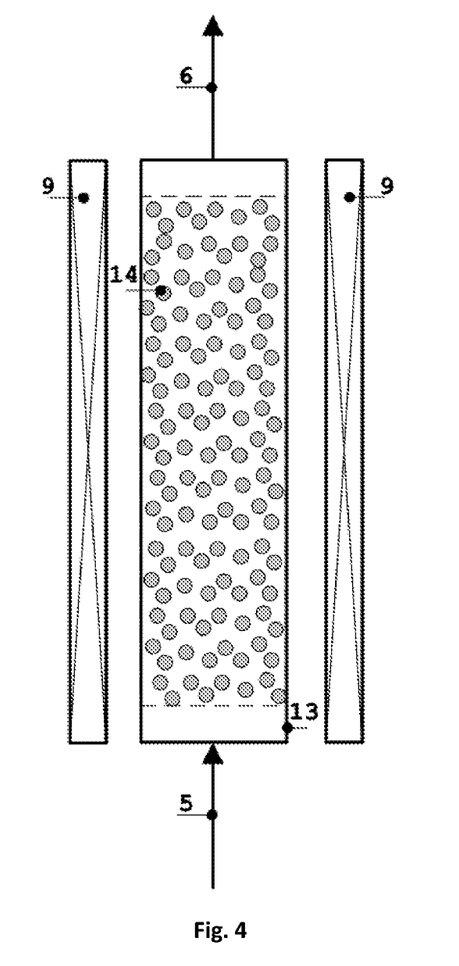
FIG. 4 illustrates a simplified schematic diagram of an alternative device for the production of hydrogen and carbon, with catalyst regeneration:
(5)—represents the inlet stream of the reactor;
(6)—represents the downstream flow of the reactor;
(9)—represents the heating system;
(13)—represents the fluidised bed reactor;
(14)—represents the catalyst pellets.

In a further embodiment of the present disclosure, methane decomposition can be carried out in a fluidised bed reactor illustrated in FIG. 4. In the reactor (13) the Ni-based supported catalyst particles (14) contact with a methane inlet flow (5) which is decomposed into hydrogen and solid carbon. The decomposition reaction is performed in a range of temperature of 500° C. and 750° C., more preferably between 550° C. and 650° C. The carbon particles detachment from the metal catalyst can be achieved by increasing the hydrogen partial pressure and/or the temperature. However, this procedure is less selective to the hydrogenation of the interfacial carbon layer, originating a higher hydrogen consumption.

Hydrogen can be selectively removed from the reactors using dense supported or unsupported metallic membranes based on Pd or Pd alloys, such as Pd—Ag alloy (77:23 wt. %). Additionally, a proton conducting cell (PCC) can separate hydrogen from unreacted methane electrochemically and running at the same temperature of the reactor. The separation can also be performed at a different temperature from the reaction medium. Carbon particles can be removed upon decantation, such as in the case of the membrane reactors, or using a cyclone, such as in the case of the fluidised reactor.

During this step, mainly methane is formed avoiding the contamination of hydrogen with undesired $CO_x$ off-gases. The regeneration step is carried out using a small fraction (up to 5%) of the produced hydrogen. This feature allows to highly increase the efficiency and feasibility of the present disclosure.

In another embodiment of the application, methane from different sources such as biomass, natural gas, tail gases and livestock farming, can be used to produce hydrogen. In this embodiment, the hydrogen purity regarding final disclosure can be tailored based on the methane source.

The produced carbon particles can be reused for render back methane upon hydrogenation in a fluidised reactor operating at a pressure between 1 bar and 30 bar and temperature ranging between 500° C. and 750° C. This allows storing hydrogen, for example produced from renewable sources, which is difficult to store and to transport. The use of carbon as a hydrogen carrier is preferable to the use of $CO_2$ (e.g., methanation of $CO_2$), since the entropy of formation of carbon is much lower than the entropy of formation of $CO_2$. This renders the thermodynamic round-trip efficiency of storing hydrogen using carbon carrier much higher compared with using $CO_2$.

Example 1

The electrochemical reactor illustrated in FIG. 1 was assembled with a MEA made of a cathode electrode of BCY loaded with Ni catalyst particles (2), a BCY membrane (3) and a Pt anode counter-electrode (4). The assembly was placed in a temperature-controlled furnace (9) and heated up to 550° C. The cathode side (2) was then fed with pure $CH_4$ (5) (5 ml·min$^{-1}$) and the decomposition conversion was assessed by analysing online the composition of the reactor outlet stream (6) by a CG equipped with TCD and FID detectors. At the same time the Pt anode (4) was fed with $N_2$ (7) until the $CH_4$ conversion reached a constant value. At this point the $CH_4$ stream (5) from the Ni electrode (2) was replaced by $N_2$ and the $N_2$ stream (7) from the Pt electrode side (4) was replaced by $H_2$. Two approaches were considered for the Ni catalyst regeneration.

Figure 5:
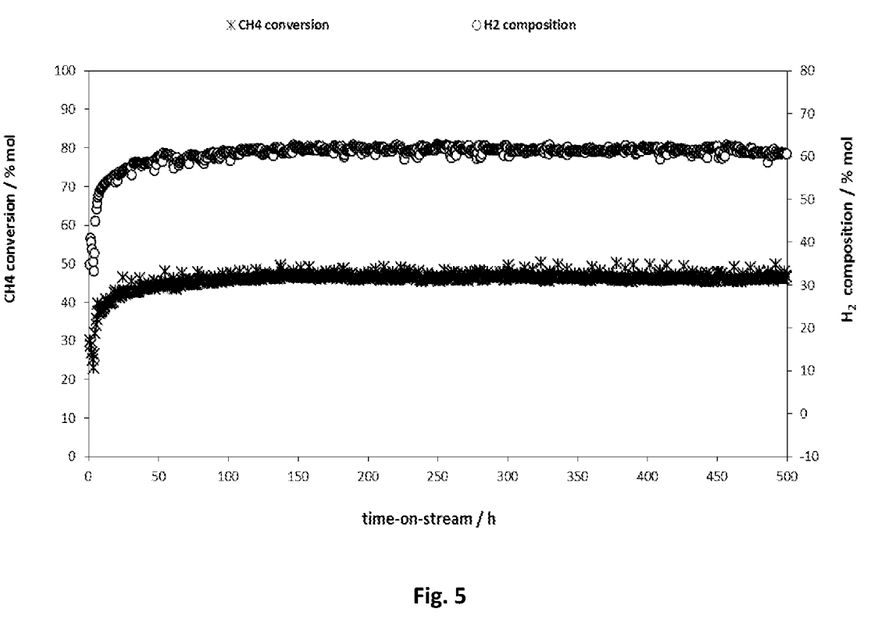
FIG. 5 is a graph of the hydrogen productivity and methane conversion versus time-on-stream during methane decomposition at 600° C.

In the first case, a potential difference of 0.4 V was applied between the electrodes to make the $H_2$ to permeate through the BCY membrane (3) and react with the carbon at the Ni (2) interface, in the cathode side. In the second case, $H_2$ was permeated to the Ni side (2) as a result of the partial pressure difference between both electrodes. In fact, at 550° C. the BCY membrane becomes permeable to $H_2$ without needing of potential difference. In both approaches the outlet stream from the Ni side (6) was analysed by GC-TCD-FID and only $H_2$ and $CH_4$ were detected. During this test decomposition steps were alternated with catalyst regeneration steps and the catalyst stability was kept for at least for 500 h. On the other hand, the $H_2$ supplied in the regeneration step represents a small fraction of the $H_2$ produced (ca. 5%). FIG. 5 shows the evolution of the $H_2$ productivity and $CH_4$ conversion with time-on-stream (over 500 h) during methane decomposition Example 2

In this example, $CH_4$ decomposition and catalyst regeneration were carried out in a chemical reactor as illustrated in FIG. 2. The reactor (10) assembly as for the previous example but the $CH_4$ decomposition was carried out at 750° C. During the regeneration step, Ni side was fed with $H_2$ (5) and different temperature and pressure conditions were tested. On the other hand, the permeate side of the membrane was maintained under $N_2$ atmosphere (7) during all these experiments.

Table 1 summarises the working conditions and main results for $CH_4$ decomposition and catalyst regeneration steps. In this regeneration approach the $H_2$ supplied in the regeneration step represents a small fraction of the $H_2$ produced (ca. 5%).

TABLE 1

Methane conversion and fraction of removed coke under different working conditions.

| CH$_4$ decomposition | | | Catalyst regeneration | | |
|---|---|---|---|---|---|
| T (° C.) | P (bar) | x$_{CH_4}$ (%) | T (° C.) | P (bar) | m$_c$ (%) |
| 750 | 1 | 76 | 550 | 3 | 20 |
|  |  |  | 550 | 6 | 20 |
|  |  |  | 650 | 3 | 40 |
|  |  |  | 650 | 6 | 40 |

Example 3

In this example, CH$_4$ decomposition and catalyst regeneration were carried out in a chemical reactor as illustrated in FIG. 3. A packed bed reactor loaded with catalyst particles from breaking the cathode layer of Example 1 run the methane decomposition at 600° C. and room pressure, with cycles of 6 h. The regeneration step was achieved feeding pure hydrogen to the reactor at 6 bar for 2 h. FIG. 6 shows the evolution of the H$_2$ productivity and CH$_4$ conversion with time-on-stream (2 cycles of 6 h) during methane decomposition.

Furthermore, it is to be understood that the invention encompasses all variations, combinations, and permutations in which one or more limitations, elements, clauses, descriptive terms, etc., from one or more of the claims or from relevant portions of the description is introduced into another claim. For example, any claim that is dependent on another claim can be modified to include one or more limitations found in any other claim that is dependent on the same base claim.

Furthermore, where the claims recite a composition, it is to be understood that methods of using the composition for any of the purposes disclosed herein are included, and methods of making the composition according to any of the methods of making disclosed herein or other methods known in the art are included, unless otherwise indicated or unless it would be evident to one of ordinary skill in the art that a contradiction or inconsistency would arise.

Where ranges are given, endpoints are included. Furthermore, it is to be understood that unless otherwise indicated or otherwise evident from the context and/or the understanding of one of ordinary skill in the art, values that are expressed as ranges can assume any specific value within the stated ranges in different embodiments of the invention, to the tenth of the unit of the lower limit of the range, unless the context clearly dictates otherwise. It is also to be understood that unless otherwise indicated or otherwise evident from the context and/or the understanding of one of ordinary skill in the art, values expressed as ranges can assume any subrange within the given range, wherein the endpoints of the subrange are expressed to the same degree of accuracy as the tenth of the unit of the lower limit of the range.

The disclosure should not be seen in any way restricted to the embodiments described and a person with ordinary skill in the art will foresee many possibilities to modifications thereof.

The above described embodiments are combinable.

The following claims further set out particular embodiments of the disclosure.

REFERENCES

Bousquet, P., Tyler, S. C., Peylin, P., Van Der Werf, G. R., Prigent, C., Hauglustaine, D. A., Dlugokencky, E. J., Miller, J. B., Ciais, P., White, J., Steele, L. P., Schmidt, M., Ramonet, M., Papa, F., Lathière, J., Langenfelds, R. L., Carouge, C., & Brunke, E. G. (2006). Contribution of anthropogenic and natural sources to atmospheric methane variability. Nature, 443 (7110), 439-443.

Lewis, S. L. (2016). The Paris Agreement has solved a troubling problem. Nature, 532 (7599), 283.

Lua, A. C., & Wang, H. Y. (2013). Decomposition of methane over unsupported porous nickel and alloy catalyst. Applied Catalysis B: Environmental, 132-133, 469-478.

Shah, N., Panjala, D., & Huffman, G. P. (2001). Hydrogen Production by Catalytic Decomposition of Methane. Energy & Fuels, 15 (6), 1528-1534.

Upham, D. C., Agarwal, V., Khechfe, A., Snodgrass, Z. R., Gordon, M. J., Metiu, H., & McFarland, E. W. (2017). Catalytic molten metals for the direct conversion of methane to hydrogen and separable carbon. Science, 358 (6365), 917-921.

The invention claimed is:

1. A continuous process for producing hydrogen in a reactor comprising:
   feeding a methane rich stream to the reactor, wherein the reactor comprises a catalyst supported in a ceramic membrane;
   contacting the methane rich stream with the catalyst at a selected temperature to produce hydrogen and deposited carbon; and
   adding a regenerating stream to react at the catalyst interface with deposited carbon for catalyst regeneration and formed carbon removal;
   wherein the regenerating stream is a hydrogen stream;
   wherein the hydrogen consumed for the carbon removal comprises up to 5 vol. % of the hydrogen produced during methane decomposition;
   wherein the decomposition of the methane rich stream and carbon removal is performed at a temperature from 500° C. to 750° C., and
   wherein the reactor is an electrochemical reactor or a chemical membrane reactor.

2. The process of claim 1, further comprising a step of activating the catalyst by heating and reducing the catalyst at a selected temperature and atmosphere prior to contacting the methane rich stream with the catalyst.

3. The process of claim 1, wherein the ceramic membrane comprises:
   porous ceramic membranes selected from the group consisting of: Al2O3, SiO2, TiO2 and ZrO2; or
   dense ceramic membranes selected from the group consisting of: BCY, BZY and BCZY; or
   porous or dense metallic membranes based on Pd or Pd alloys.

4. The process of claim 3, wherein the ceramic membrane further comprises a coating layer comprising Ni, Fe, or mixtures thereof.

5. The process of claim 1, wherein the reactor further comprises a proton conducting cell for electrochemical separation of hydrogen from unreacted methane.

6. The process of claim 1, wherein the decomposition of the methane rich stream and carbon removal is performed at a pressure between 1 bar and 10 bar and at a temperature between 550° C. and 650° C.

7. The process of claim 1, wherein the regeneration duration ranges from 15 min-2 h.

8. The process of claim 1, wherein the regenerating stream is pure hydrogen recovered from the reaction step.

9. The process of claim 1, wherein the regeneration stream comprises a downstream gas from the contacting step, comprised of hydrogen and unconverted methane.

10. The process of claim 1, wherein the catalyst is an electrocatalyst and wherein the electrochemical reactor comprises the electrocatalyst, a proton conductor membrane and a counter-electrode and wherein the carbon removal from an electrocatalyst surface of the electrochemical reactor comprises contacting the electrocatalyst with an inert gas flow and feeding the counter-electrode with a pure hydrogen stream for electrocatalyst regeneration.

11. The process of claim 10, further comprising the step of applying a potential difference between the electrocatalyst and the counter-electrode to promote the permeation of the hydrogen from the regenerating gas through the membrane to react at the catalyst interface with deposited carbon for yielding methane and originating the carbon removal from the catalyst surface.

12. The process of claim 1, wherein the regenerating stream is fed directly to the catalyst interface with the deposited carbon at a pressure greater than 1.01325 bar, at a selected temperature, to produce methane from a reaction with the deposited carbon.

13. The process of claim 1, wherein the catalyst comprises Ni, Fe, or Co particles, or a mixture thereof.

* * * * *